US008782719B2

(12) United States Patent
Arsenault et al.

(10) Patent No.: US 8,782,719 B2
(45) Date of Patent: Jul. 15, 2014

(54) INFRASTRUCTURE FOR INTERACTIVE TELEVISION APPLICATIONS

(75) Inventors: Robert G. Arsenault, Redondo Beach, CA (US); Raynold M. Kahn, Los Angeles, CA (US); Richard F. Purpura, Orange, CA (US); Gilbert Zaldivar, Rancho Santa Margarita, CA (US); James D. Allen, Westlake Village, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 47 days.

(21) Appl. No.: 11/803,649

(22) Filed: May 15, 2007

(65) Prior Publication Data

US 2007/0294734 A1  Dec. 20, 2007

Related U.S. Application Data

(63) Continuation of application No. 11/589,612, filed on Oct. 30, 2006, now abandoned.

(60) Provisional application No. 60/731,140, filed on Oct. 28, 2005.

(51) Int. Cl.
*H04N 7/173* (2011.01)

(52) U.S. Cl.
USPC ............................................. 725/86; 725/87

(58) Field of Classification Search
None
See application file for complete search history.

(56) References Cited

U.S. PATENT DOCUMENTS

| 5,235,643 | A | * | 8/1993 | Anderson et al. ........ 348/E5.096 |
| 5,554,980 | A | | 9/1996 | Hashimoto et al. |
| 5,714,997 | A | | 2/1998 | Anderson |
| 5,946,051 | A | * | 8/1999 | Bril .............................. 348/553 |
| 6,002,394 | A | | 12/1999 | Schein et al. |
| 6,009,116 | A | * | 12/1999 | Bednarek et al. ............... 725/68 |
| 6,092,806 | A | | 7/2000 | Follis |
| 6,135,881 | A | | 10/2000 | Abbott et al. |
| 6,154,771 | A | | 11/2000 | Rangan et al. |

(Continued)

FOREIGN PATENT DOCUMENTS

| EP | 1225768 A1 | 7/2002 |
| WO | 00/05887 A1 | 2/2000 |

(Continued)

OTHER PUBLICATIONS

Davis, Rob; "Product Overview—Adding Value to Interactivity: Benefits, Scenarios and Components"; doc. No. MC-M305 Rel. A; Nov. 12, 2003; NDS Limited; pp. i through G3.

(Continued)

*Primary Examiner* — Fernando Alcon

(57) ABSTRACT

Methods and apparatuses for selectively displaying a video program are disclosed. A system for selectively displaying a video program in accordance with the present invention comprises a transmission station, including a server for attaching information to the video program, a plurality of satellites receiving at least an uplink signal which includes the information and the video program from the transmission station and producing a downlink signal based on the uplink signal, an antenna, the antenna receiving the downlink signal, and at least one receiver, coupled to the antenna, for receiving the downlink signal and interpreting the information in the downlink signal, wherein the at least one receiver selectively displays the video program based on at least the interpreted information.

16 Claims, 6 Drawing Sheets

(56) References Cited

U.S. PATENT DOCUMENTS

| | | |
|---|---|---|
| 6,177,931 B1 | 1/2001 | Alexander et al. |
| 6,347,086 B1 | 2/2002 | Strachan |
| 6,371,855 B1 | 4/2002 | Gavriloff |
| 6,396,473 B1 | 5/2002 | Callahan et al. |
| 6,405,371 B1 | 6/2002 | Oosterhout et al. |
| 6,536,041 B1 | 3/2003 | Knudson et al. |
| 6,544,121 B2 | 4/2003 | DeWeese et al. |
| 6,604,240 B2 | 8/2003 | Ellis et al. |
| 6,669,565 B2 | 12/2003 | Liegey |
| 6,762,798 B1 | 7/2004 | Messer et al. |
| 6,772,435 B1 | 8/2004 | Thexton et al. |
| 6,802,077 B1 * | 10/2004 | Schlarb ............... 725/104 |
| 7,010,492 B1 | 3/2006 | Bassett et al. |
| 7,146,329 B2 | 12/2006 | Conkwright et al. |
| 7,146,615 B1 | 12/2006 | Hervet et al. |
| 7,174,512 B2 | 2/2007 | Martin et al. |
| 7,370,343 B1 | 5/2008 | Ellis |
| 7,563,162 B2 | 7/2009 | Lawson et al. |
| 7,757,252 B1 | 7/2010 | Agasse |
| 7,856,646 B1 | 12/2010 | Groff et al. |
| 8,037,494 B2 | 10/2011 | Sie et al. |
| 2002/0010931 A1 | 1/2002 | Chew et al. |
| 2002/0035728 A1 * | 3/2002 | Fries ................. 725/68 |
| 2002/0054088 A1 | 5/2002 | Tanskanen et al. |
| 2002/0056087 A1 | 5/2002 | Berezowski et al. |
| 2002/0067376 A1 * | 6/2002 | Martin et al. ........... 345/810 |
| 2002/0099800 A1 | 7/2002 | Brainard et al. |
| 2002/0112238 A1 | 8/2002 | Kanojia et al. |
| 2002/0157101 A1 | 10/2002 | Schrader et al. |
| 2002/0166123 A1 | 11/2002 | Schrader et al. |
| 2002/0188958 A1 | 12/2002 | Miller |
| 2003/0007092 A1 | 1/2003 | Sonner et al. |
| 2003/0014752 A1 | 1/2003 | Zaslavsky et al. |
| 2003/0014755 A1 | 1/2003 | Williams |
| 2003/0079226 A1 | 4/2003 | Barrett |
| 2003/0084441 A1 | 5/2003 | Hunt |
| 2003/0110495 A1 | 6/2003 | Bennington et al. |
| 2003/0115585 A1 | 6/2003 | Barsness et al. |
| 2003/0126605 A1 | 7/2003 | Betz et al. |
| 2003/0204852 A1 | 10/2003 | Fenwick et al. |
| 2003/0208755 A1 | 11/2003 | Zimmerman |
| 2004/0045026 A1 | 3/2004 | Baril et al. |
| 2004/0060061 A1 | 3/2004 | Parker |
| 2004/0088729 A1 | 5/2004 | Petrovic et al. |
| 2004/0117831 A1 | 6/2004 | Ellis et al. |
| 2004/0117857 A1 | 6/2004 | Bisdikian et al. |
| 2004/0128699 A1 | 7/2004 | Delpuch et al. |
| 2004/0255336 A1 | 12/2004 | Logan et al. |
| 2005/0015803 A1 | 1/2005 | Macrae et al. |
| 2005/0028203 A1 | 2/2005 | Kim |
| 2005/0076389 A1 | 4/2005 | Lee |
| 2005/0138656 A1 | 6/2005 | Moore et al. |
| 2005/0157217 A1 | 7/2005 | Hendricks |
| 2005/0198668 A1 | 9/2005 | Yuen et al. |
| 2005/0204383 A1 | 9/2005 | Boulanger |
| 2005/0227757 A1 | 10/2005 | Simon |
| 2005/0232167 A1 | 10/2005 | Gilbert et al. |
| 2005/0273830 A1 | 12/2005 | Silver et al. |
| 2005/0283799 A1 | 12/2005 | Domegan et al. |
| 2006/0015903 A1 | 1/2006 | MacBeth et al. |
| 2006/0080709 A1 | 4/2006 | Kwon et al. |
| 2006/0184966 A1 | 8/2006 | Hunleth et al. |
| 2006/0184989 A1 | 8/2006 | Slothouber |
| 2006/0230427 A1 | 10/2006 | Kunkel et al. |
| 2006/0236342 A1 | 10/2006 | Kunkel et al. |
| 2007/0011702 A1 | 1/2007 | Vaysman |
| 2007/0124773 A1 | 5/2007 | Morris |
| 2007/0157221 A1 | 7/2007 | Ou et al. |
| 2007/0157248 A1 | 7/2007 | Ellis |
| 2008/0184296 A1 | 7/2008 | Alten et al. |
| 2010/0077427 A1 | 3/2010 | Helms et al. |
| 2010/0131983 A1 | 5/2010 | Shannon et al. |
| 2010/0153999 A1 | 6/2010 | Yates |
| 2010/0223642 A1 | 9/2010 | Knudson et al. |
| 2011/0001879 A1 | 1/2011 | Goldey et al. |
| 2012/0304066 A1 | 11/2012 | Brodersen et al. |

FOREIGN PATENT DOCUMENTS

| | | |
|---|---|---|
| WO | 00/77752 A2 | 12/2000 |
| WO | 02/45304 A2 | 6/2002 |
| WO | WO 2004/051453 | 6/2004 |

OTHER PUBLICATIONS

British Examination Report dated May 21, 2010 in British Patent Application No. 0809083.9 filed Oct. 30, 2006 by Robert G. Arsenault et al.

Written Opinion dated Mar. 6, 2007 in International Application No. PCT/US2006/042481 filed Oct. 30, 2006 by Robert G. Arsenault et al.

* cited by examiner

INFRASTRUCTURE FOR INTERACTIVE TELEVISION APPLICATIONS

CROSS REFERENCE TO RELATED APPLICATION

This application is a continuation of U.S. patent application Ser. No. 11/589,612, filed Oct. 30, 2006, now abandoned, entitled "Infrastructure For Interactive Television Applications". This application is related to and claims the benefit of the earlier filing date under 35 U.S.C. §119(e) of U.S. Provisional Application Ser. No. 60/731,140 filed Oct. 28, 2005, entitled "Infrastructure for Interactive Television Applications," the entirety of which is incorporated herein by reference.

BACKGROUND OF THE INVENTION

1. Field of the Invention

The present invention relates to communication systems, and more particularly to an infrastructure for interactive television applications.

2. Description of the Related Art

FIGS. 1A and 1B illustrate a typical satellite based broadcast systems of the related art.

FIG. 1A shows television broadcasting system 20, which transmits and receives audio, video, and data signals via satellite. Although the present invention is described in the context of a satellite-based television broadcasting system, the techniques described herein are equally applicable to other methods of program content delivery, such as terrestrial over-the-air systems, cable-based systems, and the Internet. Further, while the present invention will be described primarily with respect to television content (i.e. audio and video content), the present invention can be practiced with a wide variety of program content material, including television content, audio content, or data content.

Television broadcasting system 20 includes transmission station 26, uplink dish 30, satellite 32, and receiver stations 34A-34C (collectively referred to as receiver stations 34). Transmission station 26 includes a plurality of input lines 22 for receiving various signals, such as analog television signals, digital television signals, video tape signals, original programming signals and computer generated signals containing HTML content. Additionally, input lines 22 receive signals from digital video servers having hard discs or other digital storage media. Transmission station 26 also includes a plurality of schedule feeds 24, which provide electronic schedule information about the timing and content of various television channels, such as that found in television schedules contained in newspapers and television guides. Transmission station 26 converts the data from schedule feeds 24 into program guide data. Program guide data may also be manually entered at the site of transmission station 26. The program guide data consists of a plurality of "objects". The program guide data objects include data for constructing an electronic program guide that is ultimately displayed on a user's television.

Transmission station 26 receives and processes the various input signals received on input lines 22 and schedule feeds 24, converts the received signals into a standard form, combines the standard signals into a single output data stream 28, and continuously sends output data stream 28 to uplink dish 30. Output data stream 28 is a digital data stream that is compressed using MPEG2 encoding, although other compression schemes may be used.

The digital data in output data stream 28 are divided into a plurality of packets, with each such packet marked with a service channel identification (SCID) number. The SCIDs are later used by receiver 64 (shown in FIG. 1B) to identify the packets that correspond to each television channel. Error correction data is also included in output data stream 28.

Output data stream 28 is a multiplexed signal that is modulated by transmission station 26 using standard frequency and polarization modulation techniques. Output data stream 28 preferably includes 16 frequency bands, with each frequency band being either left polarized or right polarized. Alternatively, vertical and horizontal polarizations may be used.

Uplink dish 30 continuously receives output data stream 28 from transmission station 26, amplifies the received signal and transmits the signal to satellite 32. Although a single uplink dish and satellite are shown in FIG. 1, multiple dishes and satellites are preferably used to provide additional bandwidth, and to help ensure continuous delivery of signals.

Satellites 32 revolve in geosynchronous orbit about the earth. Satellites 32 each include a plurality of transponders that receive signals transmitted by uplink dish 30, amplify the received signals, frequency shift the received signals to lower frequency bands, and then transmit the amplified, frequency shifted signals back to receiver stations 34.

Receiver stations 34 receive and process the signals transmitted by satellites 32. Receiver stations 34 are described in further detail below with respect to FIG. 1B.

FIG. 1B is a block diagram of one of receiver stations 34, which receives and decodes audio, video and data signals. Receiver station 34 includes receiver dish 60, alternate content source 62, receiver 64, television 66, recording device 68, remote control 86 and access card 88. Receiver 64 includes tuner 70/demodulator/Forward Error Correction (FEC) decoder 71, digital-to-analog (D/A) converter 72, CPU 74, clock 76, memory 78, logic circuit 80, interface 82, infrared (IR) receiver 84 and access card interface 90. Receiver dish 60 receives signals sent by satellite 32, amplifies the signals and passes the signals on to tuner 70. Tuner 70 operates under control of CPU 74.

The CPU 74 operates under control of an operating system stored in the memory 78 or within an auxiliary memory within the CPU 74. The functions performed by CPU 74 are controlled by one or more control programs or applications stored in memory 78. Operating system and applications are comprised of instructions which, when read and executed by the CPU 74, cause the receiver 64 to perform the functions and steps necessary to implement and/or use the present invention, typically, by accessing and manipulating data stored in the memory 78. Instructions implementing such applications are tangibly embodied in a computer-readable medium, such as the memory 78 or the access card 88. The CPU 74 may also communicate with other devices through interface 82 or the receiver dish 60 to accept commands or instructions to be stored in the memory 78, thereby making a computer program product or article of manufacture according to the invention. As such, the terms "article of manufacture," "program storage device" and "computer program product" as used herein are intended to encompass any application accessible by the CPU 74 from any computer readable device or media.

Memory 78 and access card 88 store a variety of parameters for receiver 64, such as a list of channels or services that the receiver 64 is authorized to process and generate displays for; the zip code and area code for the area in which receiver 64 is used; the model name or number of receiver 64; a serial number of receiver 64; a serial number of access card 88; the name, address and phone number of the owner of receiver 64; and the name of the manufacturer of receiver 64.

Access card 88 is removable from receiver 64 (as shown in FIG. 1B). When inserted into receiver 64, access card 88 is coupled to access card interface 90, which communicates via interface 82 to a customer service center (not pictured). Access card 88 receives access authorization information from the customer service center based on a user's particular account information. In addition, access card 88 and the customer service center communicate regarding billing and ordering of services.

Clock 76 provides the current local time to CPU 74. Interface 82 is preferably coupled to a telephone jack at the site of receiver station 34. Interface 82 allows receiver 64 to communicate with transmission station 26 via telephone lines. Interface 82 may also be used to transfer data to and from a network, such as the Internet.

The signals sent from receiver dish 60 to tuner 70 are a plurality of modulated rf signals. The desired rf signal is then downconverted to baseband by the tuner 70, which also generates in-phase and quadrature (I and Q) signals. These two signals are then passed to the demodulator/forward-error-correction (FEC) application specific integrated circuit (ASIC) 71. The demodulator 71 ASIC then demodulates the I and Q signals and the FEC decoder correctly identifies each transmitted symbol. The received symbols for quaternary phase shift keying (QPSK) or 8PSK signals carry two or three data bits, respectively. The corrected symbols are translated into data bits, which in turn are assembled in to payload data bytes, and ultimately into data packets. The data packets may carry 130 data bytes or 188 bytes (187 data bytes and 1 sync byte).

In addition to the digital satellite signals received by receiver dish 60, other sources of television content are also preferably used. For example, alternate content source 62 provides additional television content to television 66. Alternate content source 62 is coupled to tuner 70. Alternate content source 62 can be an antenna for receiving off the air signals NTSC signals, a cable for receiving ATSC signals, or other content source. Although only one alternate content source 62 is shown, multiple sources can be used.

Initially, as data enters receiver 64, tuner 70 looks for a boot object. Boot objects are always transmitted with the same SCID, so tuner 70 knows that it must look for packets marked with that SCID. A boot object identifies the SCIDs where all other program guide objects can be found. The information from the boot object is used by tuner 70 to identify packets of program guide data and route them to memory 78.

Remote control 86 emits infrared signals that are received by infrared (IR) receiver 84 in receiver 64. Other types of data entry devices may alternatively be used, such as an ultra-high frequency (UHF) remote control, a keypad on receiver 64, a remote keyboard and a remote mouse. When a user requests the display of a program guide by pressing the "guide" button on remote control 86, a guide request signal is received by IR receiver 84 (shown in FIG. 2) and transmitted to logic circuit 80. Logic circuit 80 informs CPU 74 of the guide request. In response to the guide request, CPU 74 causes memory 78 to transfer a program guide digital image to D/A converter 72. D/A converter 72 converts the program guide digital image into a standard analog television signal, which is then transmitted to television 66. Television 66 then displays the program guide. Television 66 may alternatively be a digital television, in which case no digital to analog conversion is necessary.

Users interact with the electronic program guide using remote control 86. Examples of user interactions include selecting a particular channel or requesting additional guide information. When a user selects a channel using remote control 86, IR receiver 84 relays the user's selection to logic circuit 80, which then passes the selection on to memory 78 where it is accessed by CPU 74. CPU 74 instructs tuner 70 to output the audio and video packets for the selected channel to D/A converter 72. D/A converter 72 performs an MPEG2 decoding step on received packets, converts the packets to analog signals, and outputs the analog signals to television 66.

Recently, broadcasting system 20 has begun transmitting interactive services and channels to receiver stations 34. This new layer of interactivity creates new challenges and issues to be resolved in system 20, such as how the interactive commands are sent and used within system 20. It can be seen, then, that there is a need in the art to allow for control and management of interactive services in a broadcasting system.

SUMMARY OF THE INVENTION

To minimize the limitations in the prior art, and to minimize other limitations that will become apparent upon reading and understanding the present specification, the present invention discloses methods and apparatuses for selectively displaying satellite-based television signals in communications systems. A method in accordance with the present invention comprises querying an Application Program Interface (API) with an application, determining the status of at least one video program based on a result of the query, and selectively displaying the at least one video program based on the status of the at least one video program.

Such a method further optionally includes setting a flag in the at least one video program, the flag indicating that the at least one video program is to be displayed only after the status is determined, the at least one video program being a mosaic channel comprising a plurality of viewer channels, each viewer channel in the plurality of video channels having a separate status and each viewer channel in the plurality of video channels is selectively displayed based on the separate status, the separate status being based on a service authorization or a geographical location of a receiver station, and determining at least one interactive function of the at least one video program based on the status of the at least one video program.

An infrastructure within a satellite television signal delivery system, for determining whether a video program is displayable on a television monitor in accordance with the present invention comprises a server, coupled to a transmission station, wherein the server attaches information to the video program, and a receiver station, including an Application Program Interface (API), coupled to the receiver station, wherein the API determines the status of the video program based on the information attached to the video program, wherein the receiver station selectively allows display of the video program based on the status of the video program.

Such an infrastructure further optionally includes the information attached to the video program indicating that the video program is to be displayed only after the status is determined, the video program being a mosaic channel comprising a plurality of viewer channels, each viewer channel in the plurality of video channels having a separate status and each viewer channel in the plurality of video channels is selectively displayed based on the separate status, the separate status being based on a service authorization or a geographical location of a receiver station, and determining at least one interactive function of the at least one video program based on the status of the at least one video program.

A system for selectively displaying a video program in accordance with the present invention comprises a transmission station, including a server for attaching information to the video program, a plurality of satellites receiving at least an uplink signal which includes the information and the video program from the transmission station and producing a downlink signal based on the uplink signal, an antenna, the antenna receiving the downlink signal, and at least one receiver, coupled to the antenna, for receiving the downlink signal and interpreting the information in the downlink signal, wherein the at least one receiver selectively displays the video program based on at least the interpreted information.

Such a system further optionally includes the information attached to the video program indicating that the video program is to be displayed only after a status of the video program is determined, the video program being a mosaic channel comprising a plurality of viewer channels, each viewer channel in the plurality of video channels having a separate status and each viewer channel in the plurality of video channels is selectively displayed based on the separate status, the separate status being based on a service authorization or a geographical location of a receiver station, and the receiver station determining at least one interactive function of the at least one video program based on the status of the at least one video program.

Still other aspects, features, and advantages of the present invention are inherent in the systems and methods claimed and disclosed or will be apparent from the following detailed description and attached drawings. The detailed description and attached drawings merely illustrate particular embodiments and implementations of the present invention, however, the present invention is also capable of other and different embodiments, and its several details can be modified in various respects, all without departing from the spirit and scope of the present invention. Accordingly, the drawings and description are to be regarded as illustrative in nature, and not as a restriction on the present invention.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

Figure 1A:
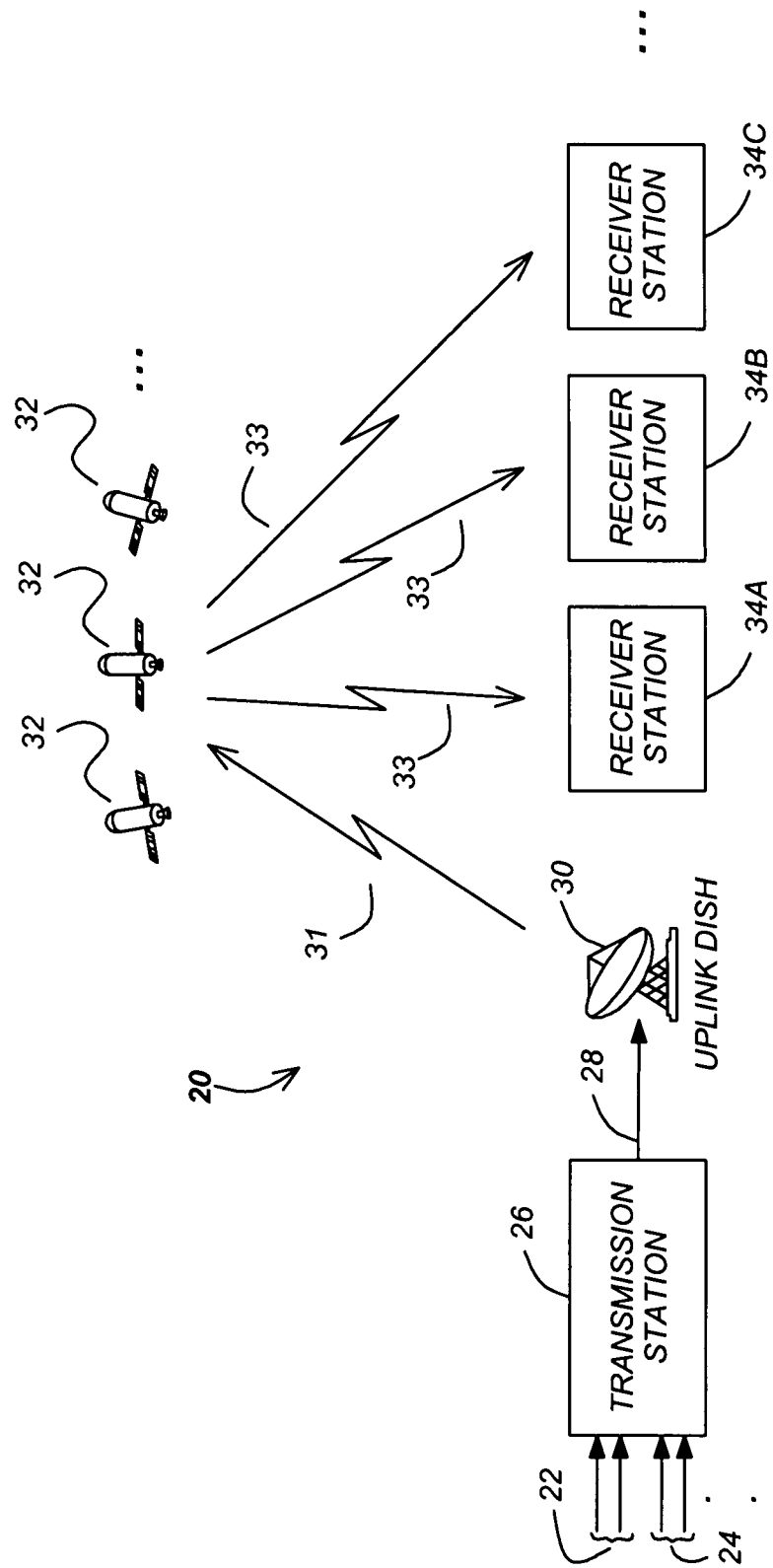
FIGS. 1A and 1B illustrate a typical satellite based broadcast systems of the related art.

In the following description, reference is made to the accompanying drawings which form a part hereof, and which show, by way of illustration, several embodiments of the present invention. It is understood that other embodiments may be utilized and structural changes may be made without departing from the scope of the present invention.

Overview

The present invention comprises an infrastructure for interactive applications, enabling the interactive applications to access Conditional Access (CA) data and to cleanly share Receiver Station 34 (also known as an Integrated Receiver/Decoder, or IRD) resources. This infrastructure allows a service provider to control these resources across multiple application developers without exposing complex CA interfaces.

The CA interface allows applications to query current authorizations, make purchases and execute parental control tasks. Applications can query whether a particular channel or event is authorized. For example, a sports mosaic can block a premium sports channel if a blackout applies or if the viewer is not entitled. Applications can directly purchase Pay-Per-Views and use them either to access TV content, e.g., On Request content, or to control access to parts of the application itself, e.g., different games in a games portal. Interactive applications can enforce parental limits and request PIN entry to override a spending limit or parental rating for a given application or viewer channel.

Applications can query the following CA fields: Smart Card ID, Subscriber ID, and ZIP code. ZIP code can be used for targeted advertisements or local weather. Interactive applications can use the Subscriber ID to identify the subscriber performing a transaction such as requesting a brochure or making a purchase.

The "Is Subscriber Addressed?" feature enables an interactive application to determine whether the subscriber matches a combination of CA traits, such as a given subscription and any one of a list of region bits. This mechanism isolates the interactive application author from the meaning of CA data and is, therefore, much easier to use.

Store and Forward (S&F) allows an application to store data in the receiver station 34 on NVRAM, disk (Digital Video Recorder (DVR)) or Flash. Access to S&F is controlled by an interactive application certificate, including how much data space is allocated uniquely to this interactive application, when that data expires, and whether any other interactive applications can use it. The forwarding mechanism returns interactive application data to the head-end as a background task. This means that the interactive application needn't be running when the data is forwarded. The data can be returned immediately, every few days, or upon head-end command. S&F manages issues such as call back randomization, retries and permitted call back time windows. S&F thereby would allow a voting application to spread responses over a period of time, without peak loading.

Controlled Return Path ensures that only authorized receiver stations 34 can access the signals 33 in network 20. The Controlled Return Path uses the well-known Radius CHAP protocol: only after properly responding to a challenge using access card 88 codes will the POP issue an IP address to the receiver station 34 and allow the connection to be established.

Secure Return Path (SRP) is an additional layer of security, encrypting all messages from the receiver station 34 to the application server. SRP uses secrets stored in the access card 88 in a "Bi-lateral Protocol". It does require decryption in the secure system 20 environment, and re-encryption under TLS (the industry standard security protocol used for commerce on the Internet) for the hop to the application server.

Figure 2:
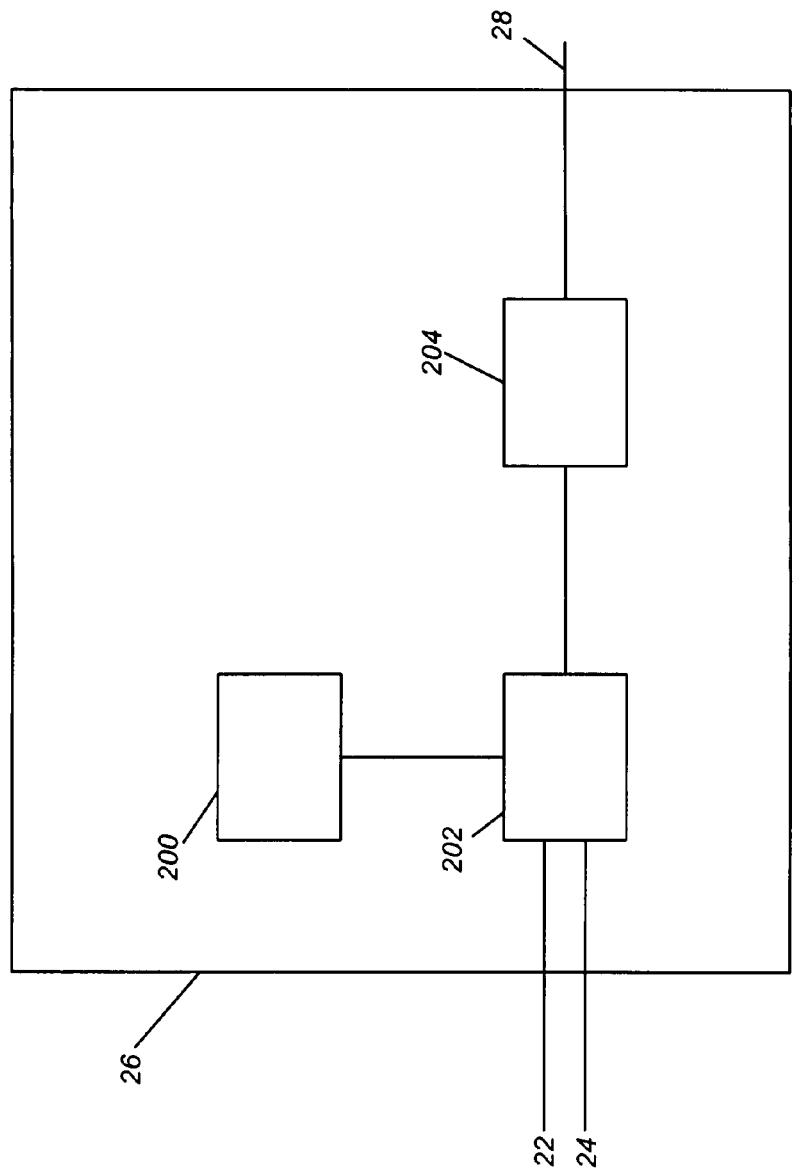
FIG. 2 illustrates a block diagram of the transmission station in accordance with the present invention.

FIG. 2 illustrates a block diagram of the transmission station in accordance with the present invention.

Within transmission station 26, a server 202 is used to insert symbols and programming into uplink signals 31 that are then transmitted to receiver stations 34. Server 202 provides the proper programming to receiver stations 34, which comprises an interactive application that interfaces with this programming.

Further, interactive applications are registered at server 202, via programming or other means, as specific types of applications, such as "application prior" applications where audio is muted and video is blacked out prior to the application being loaded and executed, so when the programming is received at a receiver station 34, the receiver station 34 will be able to properly handle the application, and "video prior" applications, where video appears and audio is played before the application loads and executes.

Figure 1B:
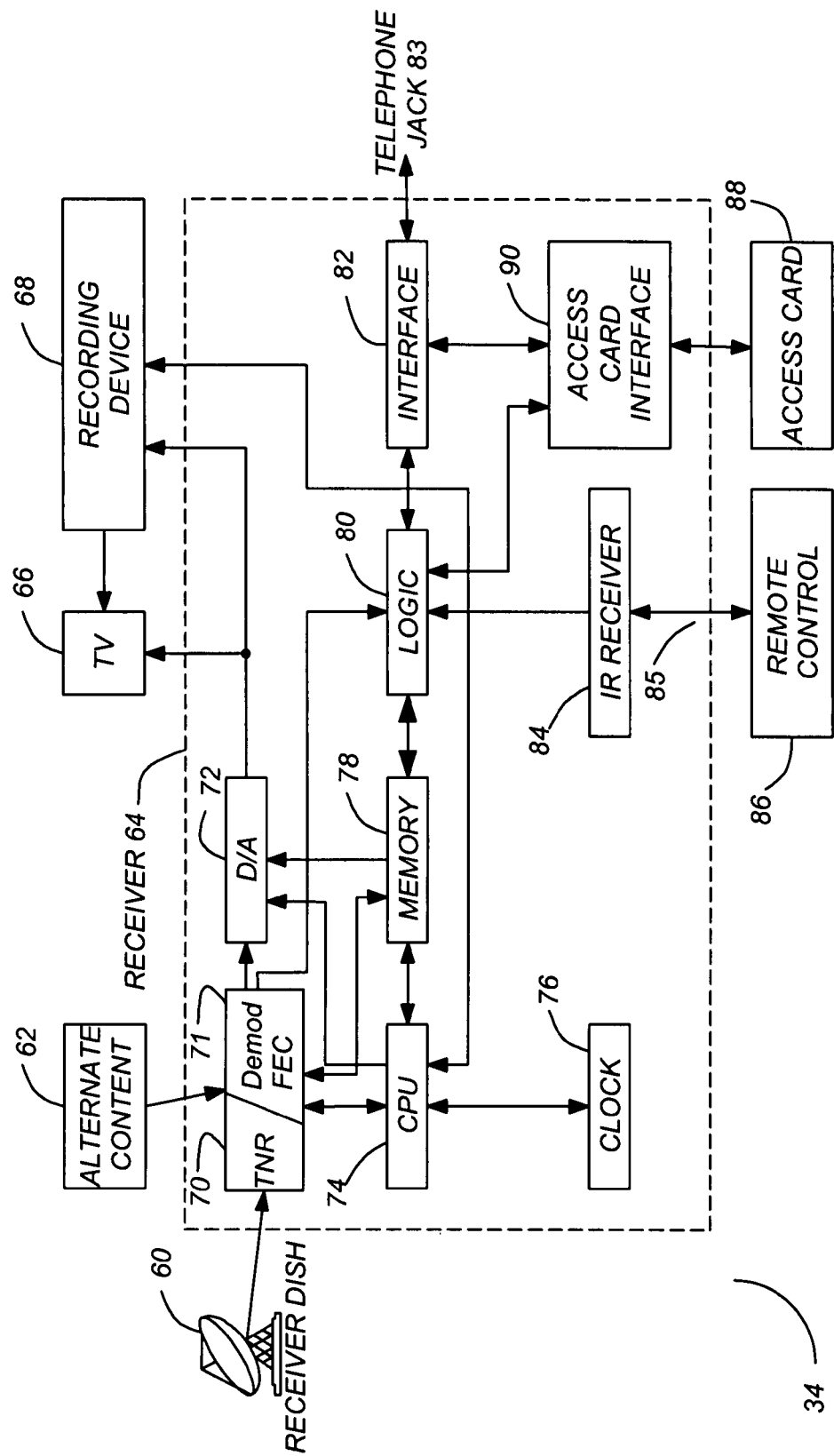

For example, and not by way of limitation, a Purchase Information Packet (PIP) for an interactive Pay-Per-View (PPV) program, such as a game, is generated by interface 200 and attached by server 202 to input streams 22 and 24, as needed. This stream is then passed to interactive interface 204 and transmitted on signal 28 to receiver stations 34 as shown in FIG. 1.

Prior to any viewing of the PPV program, the receiver station 34 will not show any video or play any audio until the PPV program is properly authorized by access card 88 in the receiver station 34, via the logic 80 and other functions of the receiver station 34 described herein. Once the PPV program is authorized, video and audio are forwarded to the television monitor 66 for viewing by a user.

Operation

Figure 3:
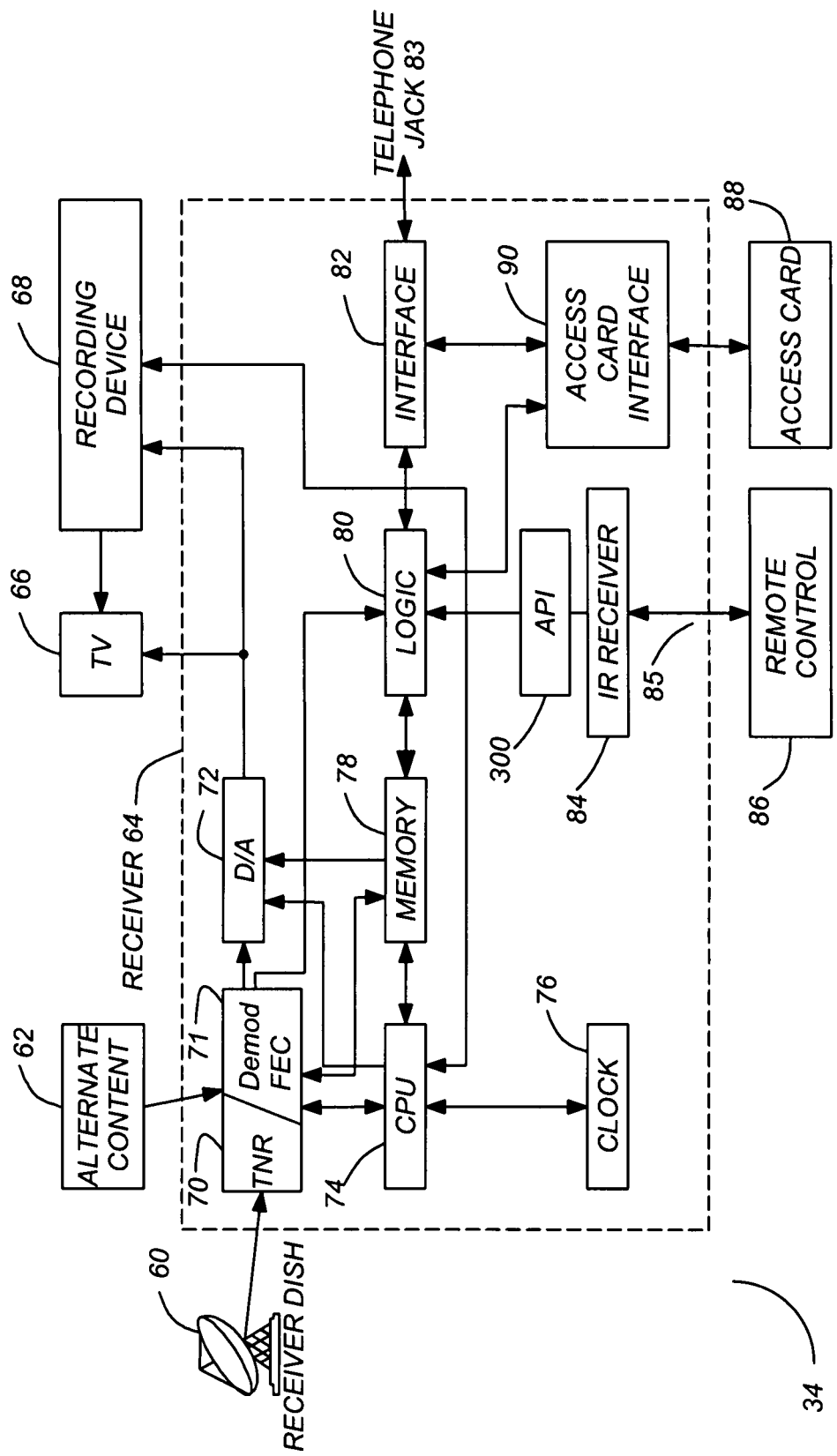
FIG. 3 illustrates changes to receiver station 34 in accordance with the present invention.

FIG. 3 illustrates changes to receiver station 34 in accordance with the present invention.

Application Programming Interface (API) 300 is used to intercept commands from remote control 86 as well as any commands generated at the front panel of receiver station 34. API 300 provides the interface for interactive applications that are demodulated by demod/FEC 71 that may need special handling. API 300 provides a universal interface for programming providers to interface with various types of interactive programming without the need to disclose access card 88 proprietary information.

Each interactive program needs different types of interfaces. For example, and not by way of limitation, a mosaic channel with several different video feeds being shown simultaneously may have one or more of the video feeds "blacked out" in certain geographic areas due to sports league rules regarding program viewing in certain areas. A broadcast of a home football game in Indianapolis, for example, where the game is not sold out in advance, is not allowed under National Football League (NFL) broadcast rules. The receiver stations 34 that are resident in the blacked-out area need to be informed that any broadcast of the Indianapolis game must be blacked out not only on the viewer channel showing that game, but also on any mosaic channel showing that game. The API 300 provides the programming interface to receiver station 34 which then prevents the game from being shown in those geographic areas.

The interactive application is registered as a certain type of application at the transmission station 26, via server 200, as described in FIG. 2. When received by the receiver station 34, the application is demodulated and converted by demod/FEC 71 and D/A 72. However, before being allowed to pass to the television 66 or recording device 68, when the channel containing the interactive application is selected by remote control 86 (or by a front panel selection on receiver station 34), API 300 intercepts the command to tune to the interactive application and performs certain functions based on how the function was registered at transmission station 28, and whether or not the specific receiver station 34 is authorized to receive and display the given interactive application.

The API 300 also allows the interactive application to determine whether a given receiver station 34 is allowed to display the interactive application for other reasons, e.g., parental control checking, program ratings, channel blocking, etc. So, for example, if a receiver station 34 is blocked from receiving specific channels, either because the programming package purchased by the viewer does not allow viewing of that channel, or by specific channel blocking by the user to prevent unwanted programming, the API 300 will determine that the given interactive application is or is not authorized to be passed to television 66 or recording device 68. Further, the API 300 provides on-television 66 screen messages when portions of the interactive application have changed. For example, when the PIP for a purchased game changes, because time is running out on the game purchase or there is a special pricing available for that game for a given amount of time, an on-screen notification can be provided to inform the viewer of such changes. Other on-screen notifications are also possible based on the situation and desires of programmers and the service provider.

Such on-screen displays can also provide "reason codes" which give the viewer additional information as to the reason for the on-screen display. For example, if a viewer is trying to purchase an interactive PPV event, but the PPV event requires the user to authorize a charge to a credit card or the user's account, a Personalized Identification Number (PIN) may be required, and the on-screen display may ask for that PIN. If the PPV event rating exceeds the rating that is assigned to a given receiver station 34, a different on-screen display may state that the event cannot be displayed without increasing the programming rating for that receiver station 34. Interactive applications can be programmed with various types of on-screen displays, and these on-screen displays can be selected by providing the programming to the interactive application at transmission station 28, which is then demodulated at receiver station 34 for use by API 300.

The interactive application, when programmed and entered at transmission station 28, must also be able to determine whether or not a given receiver station 34 comprises API 300. Further, if a given receiver station 34 does comprise API 300, there may be different versions of API 300 to support various levels of programming and service, and, as such, the interactive application must know which functions a given API 300 does support, so the interactive application will run on any version of receiver station 34 without problems. To accomplish this, some interactive applications may need to have programming that disables the interactive application entirely, or disable portions of the interactive application, depending on which receiver station 34 is receiving the interactive application.

The API 300 of the present invention also allows for receiver station 34, via interactive applications, to query the viewer for information. For example, and not by way of limitation, certain interactive applications, such as mosaic channels described herein above, cannot show certain programs in certain zip codes due to programming blackouts or other reasons. So, when an interactive application is requested by a viewer, either via remote control 86 or the front panel of receiver station 34, the API 300 will ask the viewer to provide a zip code as an input on an on-screen display to allow for the proper viewing of the games being shown on the requested mosaic channel. The zipcode provided can then be stored on access card 88 or directly in memory 78, for use on later interactive applications as needed.

Callback Information

The present invention also supports applications that may require communication between the application and the server 202. The present invention supports multiple callback phone numbers to be used in different scenarios.

For some callbacks, known as synchronous callbacks because they occur during the execution of the application, the application provides the phone number to the logic 80 to be routed through interface 82. The application can also reference a known phone number from the access card 88 or can reference a named parameter stored phone number in the memory 78 from the verifier using instructions within the application if desired.

For asynchronous callbacks, which do not have to occur during the execution of the application, the application can use the default phone number from a S&F schema, or override that phone number if the certificate permits overriding the phone number. Again, the application can provide the phone number to the logic 80 and interface 82; application can also reference a known phone number from the access card 88 or can reference a named parameter stored phone number in the memory 78 from the verifier using instructions within the application if desired.

Further, the receiver station 34 can have a default telephone number, which can be a "1-800" number, or another phone number, as well as an additional set of user or service provider provided phone numbers. The application can use instructions to use this system phone number in any of the callback situations. When the system phone number is selected, the present invention uses the provided numbers if they exist, or uses the default 1-800 number. The number selected can be based on a specific instruction to use a local number, the default 1-800 number, or a predetermined hierarchy which can be overridden by the application if desired. The default 1-800 number can also be changed via the user or via downlink signals 33 and replaced in the memory 78 as needed.

If the receiver station 34 is unable to complete the callback when first attempted, the receiver station will continue to try to complete the callback until successful. The present invention also allows for a certain number of retries before reporting unsuccessful callback attempts to the user for manual intervention. The number of retries can be changed either by the service provider or the user as desired. Further, the available phone numbers can be tried in sequence rather than trying a single number until the number of retries is exhausted.

The present invention also determines if the callback number is a proper number, e.g., receives an answer from a computer modem or not, and depending on the result, amends the call attempt schema. For example, and not by way of limitation, if a call results in a non-computer modem answer, then that particular number will not be called again during the current call window for this callback by the receiver station 34. This number may also be disabled by the receiver station 34 until a new list of local access numbers is received and stored in memory 78.

Results of callbacks are reported to the application so the application can properly address the results as needed. Receiver station 34 also validates and updates, as needed, the phone list at the initiation of callbacks generated by the API 300 and the application by requesting a new phone number list from server 202.

Example Application

Figure 4:
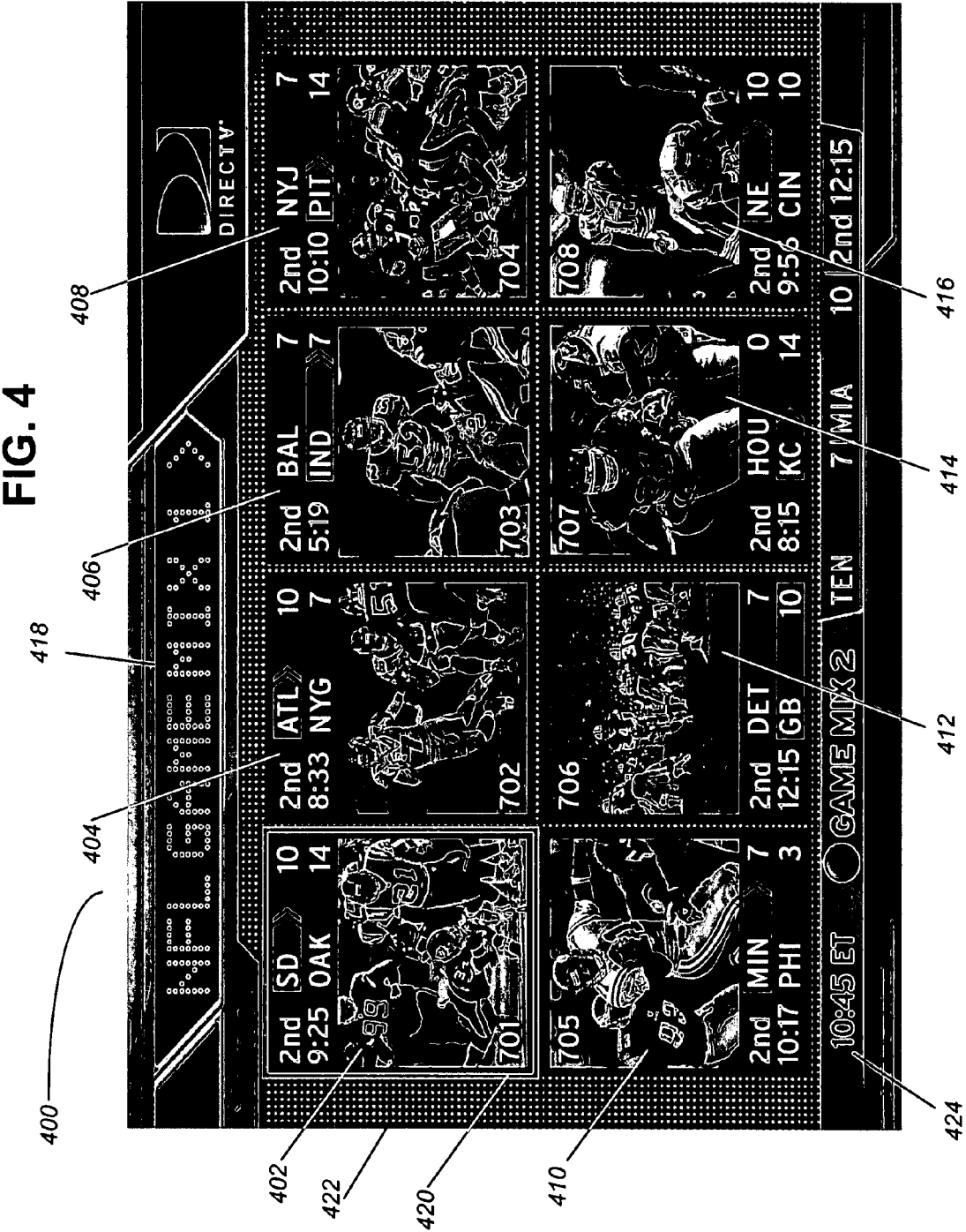
FIG. 4 illustrates a typical eight-cell matrix with a generic video feed in accordance with the present invention.

FIG. 4 illustrates a typical eight-cell matrix with a generic video feed in accordance with the present invention.

Interactive mosaic channel 400 is shown as being displayed on television 66. Within interactive mosaic channel 400, there are a number of video cells 402-416 and a text box 418, also referred to as an On Screen Display (OSD) 418. Optionally, the interactive mosaic channel 400 further comprises a cursor 420, a background video graphic 422, and a dynamic ticker 424.

The number of video cells 402-416 can change based on the number of video cells 402-416 desired. As the number of video cells 402-416 increases, of course, there must be a reduction in the size of the video cells 402-416 to ensure that the video cells 402-416 can be differentiated on the television 66. As the number of video cells 402-416 decreases, the size of the video cells 402-416 can increase, since there is more space available on television 66 to display video cells 402-416.

Further, the placement of video cells 402-416, text box 418, background graphic 422, and ticker 424 is not limited to the positions on television 66 as shown in FIG. 2. These elements 402-416, 418, 422, and 424 can be displayed anywhere on television 66 without departing from the scope of the present invention.

As there are multiple video feeds, e.g., one video feed for each video cell 402-416 being presented, each video cell 402-416, as well as text box 418, background video 422 and possibly dynamic ticker 424, have associated audio portions that can be played. Presenting more than one audio stream may be confusing to a viewer of television 66; as such, it is typical that only one audio stream of information is presented at a given time. Further, each of the video feeds may also have closed-captioning information associated with it, and selection of a closed-captioned presentation, rather than an audio presentation, can be performed if desired.

Video Cells

Video cells 402-416 each typically contain a separate viewer channel of programming. Further, each video cell 402-416 contains other information that is presented within the video cell as described herein.

Channel indicator 426 is shown within video cell 402, to show the viewer the "direct tune" channel number for that video cell 402. For example, video cell 402 shown in FIG. 2 shows a channel indicator 426 displaying channel 701 as the channel for that video information. When cursor 420 is placed on (or around) that video cell 402, as is shown in FIG. 2, the audio or other associated data for that video cell 402 can be presented to the viewer.

Related Data

There also may be other related data for a given video cell 402-416 that is of interest to a viewer. For example, as shown in video cell 402, the video feed content is a National Football League™ game. For other types of video feeds, video cells 402-416 may provide other types of information. For example, in a hockey game, possession of the puck by a given team does not necessarily indicate an advantage in the game or an impending score. However, if one hockey team is on a power play, or has a two-person advantage, visual clues can be given to indicate theses condition by changing color, flashing, or other graphical indication to the viewer, such that the game condition is known by glancing at the mix channel 400 in an overview fashion, rather than paying attention to each video cell 402-416 in detail to determine the progress of each video feed.

Text Box

Text box 418 contains textual information that is useful to the viewer, and this information can change depending on the viewer's selection of interactive services as described herein. For example, the text box 418 can contain a generic statement about the genre of the interactive mosaic channel 400, or statements directed to a selected video cell 402-416 or information related to a selected video cell 402-416 to describe to a user the meaning of the information presented in the video cell 402-416 or other information related to the video cell 402-416. The text box can also scroll to present additional information to the viewer that does not all fit within text box 418 at a given time.

There can also be default text associated with each interactive mosaic channel 400, and, depending on the capabilities of IRD 112, each time an interactive mosaic channel 400 is tuned to, a default descriptive text shall be displayed in the text box 418.

Background Video

Background video 422 is typically a backdrop for the interactive mosaic channel 400. The background video 422 can be related to the genre of the interactive mosaic channel 422; for example, in a news environment, the background video 208 can be related to a top news story, the stock market exchange building, a prominent government building, etc. The background video 422 can be changed or can be a dynamic video depending on the desires of the editorial staff or viewer preferences. Further, the background video 422 can be a logo or other indicator of the source of the interactive mosaic channel 400, such as DIRECTV.

Dynamic Ticker

The dynamic ticker 424 can be used to provide real-time updates to the genre of the interactive mosaic channel 400. For example, in a sports environment, the dynamic ticker 424 can provide updated scores or breaking news, or act as an alert system as described herein. The dynamic ticker 210 can also be used to present other information, such as statistics, closed captioning information, or other information, that can be related to the genre or to other issues. The dynamic ticker 424 can also be updated with new information at a different rate than that of the video cells 402-416, because the source of information that is used to create dynamic ticker 424 comes from a different source than the information that is presented in video cells 402-416.

Viewer Interaction

By selecting a given video cell 402-416, the viewer is selecting a specific characteristic associated with that given video cell 402-416, or associated video feed 228 used to generate that video cell 402-416. In most instances, when the viewer selects a given video cell 402-416 via cursor 420, the audio portion associated with the selected video cell 402-416 will be presented to the viewer, rather than a generic audio portion associated with interactive mosaic channel 400. Further, selection of a given video cell 402-416 with cursor 420 may also select a closed captioning data stream associated with the selected video cell 402-416, depending on the availability of such a data stream and/or other settings that a viewer has selected. Cursor 420 can be moved to any of the video cells 402-416, and, optionally, can be moved to select text box 418 or ticker 424.

When cursor 420 is moved to a given video cell 402-416, or to text box 418 or ticker 424, text box 418 also may undergo a change in information. Typically, when the video cell 402-416 is selected by the viewer, indicated by the presence of cursor 420, text box 418 will present the information in the Advanced Program Guide (APG) that is associated with the viewer channel (indicated by channel indicator 226) selected by cursor 420. The APG typically includes information on the program or "show" that is currently being presented by the viewer channel shown in video cell 402-416, as well as the time that show is being aired and the next show to be aired on that viewer channel. Other information, either in the APG or external to the APG, can also be displayed in the text box 418 when the cursor is moved to a given video cell 402-416. The text box 418 can also remain static if desired.

As such, the viewer can "interact" with the interactive mosaic channel 400 and decide which audio track to listen to, find out a plot line of each of the shows being presented in the various video cells 402-416, or find out what is going to be aired next in the various viewer channels being presented in video cells 402-416, while variously viewing the video presentations in the video cells 402. If a specific video cell 402-416 presents video information that is of interest to a viewer, then the viewer can move cursor 500, via a remote control command, to a given video cell 402.

If the viewer decides that the selected video cell 402 is of enough interest, the viewer can then directly tune to the selected video cell 402, i.e., tune directly to that viewer channel that is providing the video and audio used to create video cell 402, by pressing a single button on the remote control (typically the "select" button on a DIRECTV remote control). This will tune the IRD 112 or television 66 to that viewer channel, which will then be presented full-screen to the viewer as in a normal television 66 viewing format.

Default Conditions

When a viewer arrives at a given interactive mosaic channel 400, the position of cursor 420 may default to the first video cell 402, any given video cell 402-416, or not be present at all. The viewer may have to press a button on the remote control to activate the cursor 420. Typically, a viewer moves the cursor 420 by using the up/down/left/right keys on a remote control associated with the IRD 112, but other methods can be used without departing from the scope of the present invention. Further, if IRD 112 is not enabled for any or enough interactive services, the cursor 420 functions may be disabled, either entirely or partially, depending on the capabilities of IRD 112.

There can also be the ability to record interactive mosaic channel 400 which will allow a viewer to record what would be several viewer channels as a single viewer channel, i.e., the recorded interactive mosaic channel 400. However, a recorded version of interactive mosaic channel 400 may act differently than a live-feed interactive mosaic channel 400, because the cursor 420 functions may no longer be consistent with a recorded version of that video information. For example, selection of a video cell 402, in a live-feed version, would tune the IRD 112 to the channel number associated with that video cell 402. When it is a recorded version, selection of that video cell would not tune the IRD 112 to the channel number, but would likely present that recorded video information in a full-television 66 format, with possible degradation of picture quality. The ability to record interactive mosaic channel 400 may also be selectively disabled if desired.

Changes in Interactive Mosaic Channel Display

Some of the interactive mosaic channels 400 may, because of the genre selected for that interactive mosaic channel 400 or for other reasons, may need to have the video cells 402-416 changed from one viewer channel to another, or to have video cells 402-416 added or deleted from the presentation of the interactive mosaic channel 400 on television 66. As such, there must be a capability to change the presentation of any given interactive mosaic channel 400. The changes may be of a time-sensitive nature, such as changes in news or sporting events, or a seasonal change, such as additional viewer channels carrying an event such as the NCAA Basketball Tournament, and thus, would be seasonally included in an interactive mosaic channel 400 presentation, or of a programming nature, where a viewer adds or deletes a viewer channel to their programming package and thus access to such a viewer channel is selectively allowed or denied. If such a viewer channel is being used to create a given interactive mosaic channel 400, then the interactive mosaic channel 400 must have the capability of adding that video feed for presentation on the monitor.

For example, in a sports genre interactive mosaic channel 400, it is typically known when a sporting event will start and which viewer channel the event will be carried on. So, interactive mosaic channel 400 can schedule the change to the video feed for that viewer channel as being shown on a video cell 402, or change away from a viewer channel that is no longer carrying a sporting event, based on a schedule or other set time-frame events.

When such changes take place, the service provider (which can be DIRECTV or some other service provider) can program the interactive mosaic channel 400 to change the video presentation on channel 200. This can be done in a variety of ways, either by selectively blacking out the video cells 402-416, presenting a graphic on the video feed during the changes made to the video cells 402-416, or other methods, presented to the viewer in such a way that the video feeds 228 used to create video cells 402-416 are not visible. It may or may not be desirable to present information on the dynamic ticker 210 that the viewer needs to wait during the change in programming. Once the interactive mosaic channel 400 programming is completed, the service provider would then send the video information that shows the new configuration of video cells 402-416, new text box 204 information, etc. Other methods of performing the change in video presentation of viewer channels are also possible within the scope of the present invention.

The service provider, and the viewer, have the ability to black out or disable viewer channels, and, as such, have the ability to black out or disable not only entire interactive mosaic channels 200, but the individual video feeds that are associated with video cells 402 that are presented within an interactive mosaic channel 400. Further, users may have the ability to create their own interactive mosaic channel 400, depending on the equipment capabilities of IRD 112, television 66, or other equipment that a specific viewer may have access to.

Operation with Interactive Channels

API 300 of the present invention allows for proper interaction with a given interactive channel, such as the mosaic channel 400 shown in FIG. 4. For example, and not by way of limitation, API 300 ensures that the video feeds used in video cells 402-416 are authorized to be displayed on a given receiver station 34. As shown in FIG. 4, video cell 402 is displaying a game between the San Diego Chargers and the Oakland Raiders, being played in Oakland. Such a game is blacked out in the San Francisco Bay Area unless the game is sold out seventy-two hours before kickoff. So, API 300 would be programmed to have the video cells 402-416 for this mosaic channel 400 as an "application prior" interactive channel to allow the receiver station 34 determine the entitlement status of each video cell within the mosaic channel 400 prior to display on the television 66.

If the particular receiver station 34 is in zip code 94101, which is in San Francisco, Calif., the video feed used in video cell 402 would be blacked out, and API 300 would provide a shutter or other blank video screen in video cell 402 of that particular receiver station 34. On the other hand, if the particular receiver station 34 is located in zip code 90045, which is in Los Angeles, Calif., the video feed used in video cell 402 would not be blacked out, and API 300 would authorize that video feed to be displayed on television 66.

The API 300 is queried by the interactive application associated with the mosaic channel 400 to determine the status of each of the video feeds, as well as the interactive features associated with cursor 420. When a viewer tunes the receiver station 34 to the mosaic channel 400, the interactive application associated with the mosaic channel 400 interacts with the API 300 to determine the functionality and display possibilities for each of the video cells 402-416, as well as cursor 420 usage and functions.

If the subscriber has not subscribed to the mosaic channel 400, the interactive channel and the API 300 may place an on-screen message that asks the subscriber if they would like to subscribe to the mosaic channel 400, and, upon the subscriber's payment for the service, the API 300 would then allow viewing of those games that are not blacked out in the subscriber's geographic area. Further, the API 300 would provide cursor 420 functions and dynamic ticker 424 information to receiver station 34, such that any command from the front panel of receiver station 34 or from remote control 86 would be properly interpreted by receiver station 34.

If the subscriber is authorized to receive and display the mosaic channel 400, the mosaic channel 400 is initially displayed with shutters or other "blank" video within the video cells 402-416, because the status of the mosaic channel is "Application Prior". API 300 then queries the interactive application portion associated with the mosaic channel 400, to check the Interactive Configuration Object (ICO) which contains the PIPs associated with each of the video cells 402-416, to see which of the video cells 402-416 can be displayed on television 66. Each of the PIPs associated with the video cells 402-416 is queried, and access card 88 determines which, if any, of the video cells 402-416 can be displayed. The PIPs associated with the video cells 402-416 are typically queried in a serial fashion, but can be queried in a parallel fashion if desired. As each PIP for each video cell 402-416 is confirmed as authorized by access card 88, the shutter or other "blank" video is removed from that video cell 402-416, and is then displayed on the viewer's television 66.

Flowchart

Figure 5:
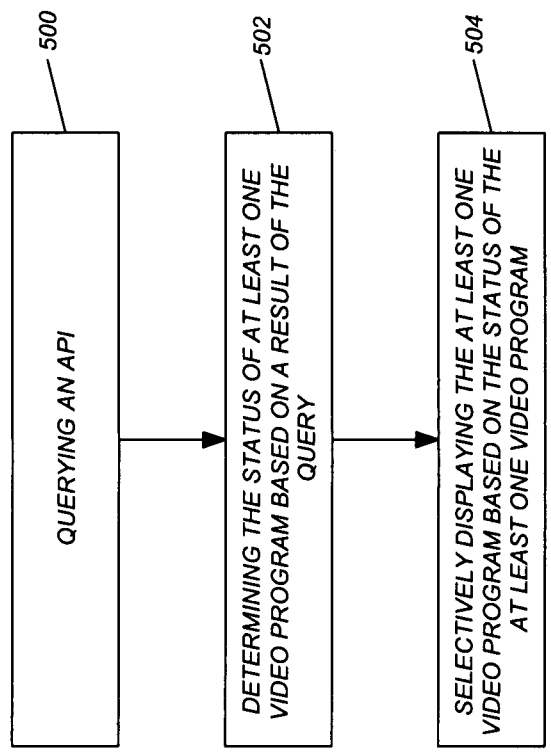
FIG. 5 is a flowchart showing the steps of the present invention.

FIG. 5 is a flowchart showing the steps of the present invention.

Box 500 represents an application querying an API.

Box 502 represents determining the status of at least one video program based on a result of the query.

Box 504 represents selectively displaying the at least one video program based on the status of the at least one video program.

CONCLUSION

In summary, the present invention comprises methods and apparatuses for selectively displaying satellite-based television signals in communications systems. A method in accordance with the present invention comprises querying an Application Program Interface (API) with an application, determining the status of at least one video program based on a result of the query, and selectively displaying the at least one video program based on the status of the at least one video program.

Such a method further optionally includes setting a flag in the at least one video program, the flag indicating that the at least one video program is to be displayed only after the status is determined, the at least one video program being a mosaic channel comprising a plurality of viewer channels, each viewer channel in the plurality of video channels having a separate status and each viewer channel in the plurality of video channels is selectively displayed based on the separate status, the separate status being based on a service authorization or a geographical location of a receiver station, and determining at least one interactive function of the at least one video program based on the status of the at least one video program.

An infrastructure within a satellite television signal delivery system, for determining whether a video program is displayable on a television monitor in accordance with the present invention comprises a server, coupled to a transmission station, wherein the server attaches information to the video program, and a receiver station, including an Application Program Interface (API), coupled to the receiver station, wherein the API determines the status of the video program based on the information attached to the video program, wherein the receiver station selectively allows display of the video program based on the status of the video program.

Such an infrastructure further optionally includes the information attached to the video program indicating that the video program is to be displayed only after the status is determined, the video program being a mosaic channel comprising a plurality of viewer channels, each viewer channel in the plurality of video channels having a separate status and each viewer channel in the plurality of video channels is selectively displayed based on the separate status, the separate status being based on a service authorization or a geographical location of a receiver station, and determining at least one interactive function of the at least one video program based on the status of the at least one video program.

A system for selectively displaying a video program in accordance with the present invention comprises a transmission station, including a server for attaching information to the video program, a plurality of satellites receiving at least an uplink signal which includes the information and the video program from the transmission station and producing a downlink signal based on the uplink signal, an antenna, the antenna receiving the downlink signal, and at least one receiver, coupled to the antenna, for receiving the downlink signal and interpreting the information in the downlink signal, wherein the at least one receiver selectively displays the video program based on at least the interpreted information.

Such a system further optionally includes the information attached to the video program indicating that the video program is to be displayed only after a status of the video program is determined, the video program being a mosaic channel comprising a plurality of viewer channels, each viewer channel in the plurality of video channels having a separate status and each viewer channel in the plurality of video channels is selectively displayed based on the separate status, the separate status being based on a service authorization or a geographical location of a receiver station, and the receiver station determining at least one interactive function of the at least one video program based on the status of the at least one video program.

It is intended that the scope of the invention be limited not by this detailed description, but rather by the claims appended hereto and the equivalents thereof. The above specification, examples and data provide a complete description of the manufacture and use of the composition of the invention. Since many embodiments of the invention can be made without departing from the spirit and scope of the invention, the invention resides in the claims hereinafter appended and the equivalents thereof.

What is claimed is:

1. A method for selectively executing an interactive application associated with a stream of a program comprising at least one of a video stream and an audio stream transmitted on at least one of a plurality of channels, comprising:
   receiving a tuning command at a receiver to tune to the at least one of the plurality of channels;
   intercepting the tuning command with an Application Programming Interface (API);
   determining an interactive application type of the interactive application, the interactive application type including a first interactive application type and a second interactive application type;
   if the determined interactive application type is the first interactive application type:
      providing the program of the stream to an output of the receiver before executing the interactive application and without inhibition by the interactive application; and
      executing the interactive application;
   if the determined interactive application is the second interactive application type:
      executing the interactive application;
      querying the API with the executing interactive application, the query comprising at least an authorization status query related to the executing interactive application;
      determining the authorization status of the stream based at least in part on a result of the query; and
      selectively providing the program of the stream to the output of the receiver based at least in part on the authorization status.

2. The method of claim 1, wherein the stream further comprises a flag indicating that the program of the stream is to be provided to the output of the receiver only after the authorization status is determined.

3. The method of claim 1, wherein the program comprises a mosaic of a plurality of video feeds, and the interactive application is the second interactive application type.

4. The method of claim 3, wherein each video feed in the plurality of video feeds has an authorization status separate from the other of the video feeds and each video feed in the plurality of video feeds is selectively provided for display based on the separate authorization status according to the interactive application.

5. The method of claim 4, wherein the separate authorization status is based on a geographical location of the receiver.

6. The method of claim 4, wherein the separate authorization status is based on a service authorization of the receiver.

7. The method of claim 4, further comprising determining at least one interactive function of the video feeds based on the authorization status of the video feeds.

8. An apparatus for selectively executing an interactive application associated with a stream of a program comprising at least one of a video stream and an audio stream transmitted on at least one of a plurality of channels, comprising:
   a receiver, comprising:
      a tuner, for receiving a tuning command to tune the at least one of the plurality of channels; and
      an application programming interface (API) for intercepting the tuning command, for determining an interactive application type of the interactive application and for providing the stream according to the interactive application type, the API permitting provision the program of the stream to an output of the receiver before execution of the interactive application and without inhibition by the interactive application if the interactive application type is the first application type and executing the interactive application before provision of the program of the stream to the output of the receiver if the interactive application is the second application type;
   wherein the executed interactive application queries the API for an authorization result related to the executing interactive application, determines the authorization status of the stream based at least in part on the authorization result, and selectively provides the stream based at least in part on the authorization result.

9. The system of claim 8, wherein the stream comprises information indicating that the stream is authorized to be provided only after the authorization status of the stream is determined.

10. The system of claim 9, wherein the program comprises a mosaic of a plurality of video feeds, and the interactive application is the second interactive application type.

11. The system of claim 10, wherein each video feed in the plurality of video feeds has an authorization status separate from the other of the video feeds and each video feed in the plurality of video feeds is selectively provided for display based on the separate authorization status according to the executing interactive application.

12. The system of claim 11, wherein the separate authorization status is based on a geographical location of the receiver.

13. The system of claim 11, wherein the separate authorization status is based on a service authorization of the receiver.

14. The system of claim 13, wherein the receiver determines at least one interactive function of the at least one video program based on the authorization status of the video feed.

15. The method of claim 1, wherein:
the interactive application type is flagged according to the selected channel.

16. The apparatus of claim 8, wherein:
the interactive application type is flagged according to the selected channel.

* * * * *